(12) United States Patent
Griffiths et al.

(10) Patent No.: US 8,095,294 B1
(45) Date of Patent: Jan. 10, 2012

(54) METHOD FOR DETERMINING FUEL INJECTION ON-TIME IN A GASEOUS-FUELLED INTERNAL COMBUSTION ENGINE

(75) Inventors: John A. J. Griffiths, Vancouver (CA); Olivier P. M. Lebastard, Burnaby (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 12/859,673

(22) Filed: Aug. 19, 2010

(51) Int. Cl.
*B60T 7/12* (2006.01)

(52) U.S. Cl. ............ 701/103; 123/525; 73/114.49

(58) Field of Classification Search .......... 701/103–105, 701/111–114; 123/294, 525–528, 27 GE, 123/575, 478, 480; 73/117.37, 114.38, 114.43, 73/114.49, 114.51
See application file for complete search history.

(56) References Cited

U.S. PATENT DOCUMENTS

| | | | |
|---|---|---|---|
| 5,222,481 A | | 6/1993 | Morikawa |
| 5,775,282 A | * | 7/1998 | Smith ................. 123/179.8 |
| 5,950,598 A | | 9/1999 | Wenzlawski et al. |
| 7,140,354 B1 | * | 11/2006 | Hashemi ................. 123/456 |
| 7,367,312 B1 | * | 5/2008 | Boyer et al. ............ 123/304 |
| 7,373,931 B2 | * | 5/2008 | Lennox et al. .......... 123/525 |
| 7,463,967 B2 | * | 12/2008 | Ancimer et al. ........ 701/104 |
| 7,627,416 B2 | * | 12/2009 | Batenburg et al. ..... 701/103 |
| 2009/0084348 A1 | * | 4/2009 | Batenburg et al. ..... 123/294 |
| 2009/0120385 A1 | * | 5/2009 | Munshi et al. .......... 123/3 |
| 2011/0017174 A1 | * | 1/2011 | Ulrey et al. ............ 123/456 |

FOREIGN PATENT DOCUMENTS

| | | |
|---|---|---|
| WO | 94/13946 | 6/1994 |
| WO | 2009/132450 | 11/2009 |

* cited by examiner

*Primary Examiner* — John Kwon
(74) *Attorney, Agent, or Firm* — McAndrews, Held & Malloy, Ltd.

(57) ABSTRACT

A method and apparatus determine the fuel injection on-time to accurately meter fuel injected directly into the combustion chamber of a gaseous fuelled internal combustion engine. The fuel injection on-time is determined by interpolating between values retrieved from two of a plurality of predetermined look-up tables, which each define fuel injection on-time as a function of gaseous fuel rail pressure and fuelling amount. Each table corresponds to a fixed value of a third parameter that correlates to in-cylinder pressure.

18 Claims, 5 Drawing Sheets

METHOD FOR DETERMINING FUEL INJECTION ON-TIME IN A GASEOUS-FUELLED INTERNAL COMBUSTION ENGINE

FIELD OF THE INVENTION

The present invention relates to a method and apparatus for determining the fuel injection on-time in a gaseous-fuelled internal combustion engine such that the amount of fuel being injected into the combustion chamber of the engine is accurately metered. "On-time" is defined herein to mean the time that an injection valve is in an open position, when fuel is being injected into a combustion chamber through the injection valve. On-time is sometimes referred to by others as "pulse width".

BACKGROUND OF THE INVENTION

Presently, many internal combustion engines are compression ignition engines fuelled by diesel fuel. In such engines, liquid fuel is injected directly into the combustion chamber so the fuel must be pumped to an injection pressure greater than the pressure inside the combustion chamber when the fuel is being introduced, to overcome the so-called "in-cylinder pressure". In a diesel engine, the peak in-cylinder pressure is typically less than 20 MPa (about 3,000 psi). However, injection pressures significantly higher than the in-cylinder pressure are desirable to assist with greater atomization of the liquid fuel, since this can lead to more efficient combustion. For example, it is not uncommon for a modern diesel engine to employ injection pressures of at least about 140 MPa (about 20,000 psi) with some engines employing diesel injection pressures as high as 220 MPa (about 32,000 psi). At such high injection pressures, because the pressure differential between injection pressure and in-cylinder pressure is so large, fluctuations in the in-cylinder pressure have little impact on the amount of fuel being injected into the combustion chamber.

Because diesel fuelled internal combustion engines still generate a considerable amount of pollutants such as oxides of nitrogen (NOx) and particulate matter (PM), recent developments to reduce emissions have been directed to substituting some of the diesel fuel with gaseous fuels such as natural gas, pure methane, ethane, liquefied petroleum gas, lighter flammable hydrocarbon derivatives, hydrogen, and blends of such fuels. Gaseous fuels are generally defined herein as fuels that are gaseous at atmospheric pressure and zero degrees Celsius. Unlike liquid fuels, gaseous fuels can be injected into an engine's combustion chamber at a lower injection pressure because no extra energy is required for fuel atomization.

An advantage of substituting a gaseous fuel for diesel fuel is that the selected gaseous fuel can be one that burns cleaner than diesel fuels, and if a gaseous fuel is injected directly into the combustion chamber late in the compression stroke, with similar timing to when diesel fuel is injected in a conventional compression ignition engine, the high efficiency and high torque normally associated with conventional diesel engines can be preserved.

Another advantage of gaseous fuels is that, as a resource, such fuels are more widely distributed around the world and the amount of proven reserves of natural gas is much greater, compared to proven oil reserves.

Gaseous fuels can also be collected from renewable sources such as vent gases from garbage dumps and sewage treatment plants. Hydrogen can be produced with electricity generated from renewable sources such as wind power and hydro-electric dams.

As noted above, the injection pressure for gaseous fuels can be lower than the injection pressure normally used for liquid diesel fuels because no extra energy is needed for atomizing the fuel. A lower injection pressure for gaseous fuels is also desirable because employing higher injection pressures would increase the parasitic load on the engine system. To achieve efficient combustion, the injection pressure for a gaseous fuel need only be sufficient to overcome in-cylinder pressure with enough energy to disperse the gaseous fuel within the combustion chamber and to introduce the desired amount of fuel within a desired injection on-time. Different engines have different compression ratios and different in-cylinder pressure profiles but by way of example, if an engine has a maximum in-cylinder pressure during the compression stroke of about 20 MPa (around 3,000 psi), an injection pressure of about 30 MPa (4,350 psi) can be sufficient for injecting the desired amount of fuel and achieving an efficient combustion. However, when the injection pressure is this close to the in-cylinder pressure, the differential pressure between the injection pressure and the in-cylinder pressure is much lower, compared to that with diesel-fuelled engines and variations in the in-cylinder pressure and the injection pressure can influence the amount of gaseous fuel that is injected into the combustion chamber, which in turn influences other factors such as combustion efficiency, engine performance and operational consistency.

The in-cylinder pressure for gaseous fuelled engines can have an even stronger influence on the fuelling rate when the gaseous fuel injection valve design employs the fuel pressure to assist with operation of the valve. For example, in known injection valve designs with an inward opening needle, it is common to use the pressure of the fuel inside the fuel injection valve to act on a shoulder feature of the valve needle to provide a portion of the opening force. In a diesel fuel injection valve, since the pressure of the diesel fuel is much greater than the in-cylinder pressure, changes in the in-cylinder pressure have no noticeable effect on the speed at which the needle of such injection valves moves from the closed to open positions. However, with a similarly designed fuel injection valve for a gaseous fuel that is introduced at a much lower injection pressure, because of the smaller differential between the in-cylinder pressure and the fuel pressure, changes in the in-cylinder pressure can influence the speed at which the valve needle moves from the closed position to the open position. That is, for a gaseous fuel injection valve, higher in-cylinder pressures can increase the valve opening speed, which can result in a higher fuel mass flow rate for a given gaseous fuel injection time. Likewise, with outward opening valves, also known as poppet-style valves, again because of the lower differential between the fuel pressure and the in-cylinder pressure, variations in the in-cylinder pressure can influence the movement of the valve when fuel pressure is relied upon to provide part of the actuating force for the valve. For example, with these types of valves higher in-cylinder pressures can hinder the opening of the valve, resulting in less fuel being introduced into the combustion chamber.

Co-owned U.S. Patent Application Publication No. 2009/0084348 describes a method of calculating a corrected pulse width by applying at least one correction factor to a baseline pulse width determined from a fuelling command. The baseline pulse width is first corrected by multiplying it by the in-cylinder pressure correction factor determined from a lookup table that inputs the timing for start of injection and the intake manifold pressure and then it is further corrected by a rail pressure correction factor. While instrumentation exists to measure in-cylinder pressure directly, such instrumentation is expensive, more suited to research purposes and is not considered economical, practical and reliable enough for large-volume commercial use. Therefore, in-cylinder pressure during an injection event is typically approximated by reconstruction from indirect measurements of parameters that correlate to in-cylinder pressure such as the intake manifold pressure and temperature, exhaust manifold pressure, engine speed and the timing for start of injection.

While previously known solutions have improved the accuracy of metering a fuel into the combustion chamber of a direct injection internal combustion engine, because in-cylinder pressure is approximated by indirect measurements, controlling the injection time of the gaseous fuel can be further improved by increasing the number of parameters that are associated with the adjustments made to injection on-time. The problem with adding more parameters is that this can add to the complexity of the determination of such adjustments, which need to be made quickly in real-time to be practical and effective, given the speed at which engines operate. In other words, there is a need for an effective and efficient method to more accurately determine the injection on-time and the amount of fuel metered into the combustion chamber of a direct injection gaseous-fuelled internal combustion engine based on several parameters.

SUMMARY OF THE INVENTION

A method for determining the fuel injection on-time is provided for an internal combustion engine fuelled with a gaseous fuel such that the amount of fuel being injected into the combustion chamber of the engine is accurately metered. The method comprises a first step of storing predetermined injection on-time values in a plurality of look-up tables, with injection on-time in each look-up table being a function of gaseous fuel rail pressure and fuelling amount and with each table being associated to a fixed value for a third parameter P which correlates to in-cylinder pressure. Input data is sent from the sensors in the engine system or from the diesel engine controller to a controller which determines from said input data values for the gaseous fuel rail pressure, the fuelling amount and the third parameter. The controller further identifies from the plurality of look-up tables two look-up tables which are associated with the fixed values for third parameter P that are closest in value to that of third parameter P determined from the input data and retrieves respective injection on-time values as a function of gaseous fuel rail pressure and fuelling amount from the identified two look-up tables. The controller further determines a desired injection on-time by interpolating between injection on-time values retrieved in the previous step. The interpolation method can be a linear interpolation, a piecewise constant interpolation, polynomial interpolation or spline interpolation depending on the parameter chosen as third parameter P.

The input data can be collected during a compression stroke and the on-time will thereby be determined for a fuel injection event beginning during said compression stroke.

Third parameter P can be one of the following: timing for start of injection, intake manifold pressure and compression pressure. In a preferred method, third parameter P can be calculated as a function of at least one parameter that correlates to in-cylinder pressure. For example, third parameter P can be a product of two parameters that correlate to in-cylinder pressure. More specifically, third parameter can be the product of intake manifold pressure and timing for start of injection. Third parameter P can be calculated using a mathematical formula comprising at least two parameters that correlate to in-cylinder pressure and which are sent to the controller as part of the input data. The two parameters can be selected from the following: timing for start of injection, intake manifold pressure, compression pressure and gaseous fuel rail.

In another embodiment of the present method, third parameter P can be calculated as a difference between two parameters at least one of which correlates to in-cylinder pressure, for example, third parameter P can be calculated by the controller as a difference between gaseous fuel rail pressure and compression pressure. Compression pressure is calculated as a function of intake manifold pressure, the engine's compression ratio and a polytropic index according to a formula known to those who are familiar with this technology. In this example, third parameter P also correlates to a pressure differential between in-cylinder pressure and injection pressure.

The present method can further comprise receiving input data regarding an engine parameter that correlates to an engine operational state, and correcting the injection on-time by applying a correction factor which is retrieved from a look-up table that determines the correction factor as a function of the fuelling amount and the engine parameter. Preferably, the engine parameter is the engine speed.

In a preferred method, the plurality of look-up tables comprises a first look-up table associated with a fixed value for third parameter P which is equal to an empirically determined minimum value for third parameter P, a second look-up table associated with a fixed value for said third parameter, which is equal to or near an empirically determined maximum value for third parameter P and a third look-up table associated with a fixed value for said third parameter, which is between said empirically determined minimum and maximum values for third parameter P. For a range of values for third parameter P between the minimum and the maximum value, the fixed value of third parameter P that is associated with the third look-up table corresponds to an inflection point or a local minimum or maximum of a curve which plots injection on-time across the range of third parameter values. When third parameter P is the product of timing for start of injection and intake manifold pressure the desired injection on-time can be determined by linear interpolation.

The present method can further comprise correcting the injection on-time by applying a correction factor that is retrieved by the controller from a plurality of look-up tables. The method then comprises storing in a plurality of predetermined correction factor look-up tables correction factor values retrievable as a function of gaseous fuel rail pressure and fuelling amount, with each look-up table corresponding to a value for a fourth parameter Q that can be one of the parameters that correlates to in-cylinder pressure which is different than third parameter P. Input data indicating values for fourth parameter Q are sent to the controller which then identifies from the plurality of predetermined correction factor look-up tables two correction factor look-up tables which correspond to fixed values of fourth parameter Q that are closest in value to that of the fourth parameter in the input data. The controller determines the desired correction factor by interpolating between the two correction factor look-up tables identified in the previous step. Fourth parameter can be one of: timing for start of injection, intake manifold pressure and compression pressure. The controller can use different interpolation methods for retrieving the desired correction factor such as polynomial interpolation or spline interpolation or simpler interpolation methods such as linear interpolation or piecewise constant interpolation.

DETAILED DESCRIPTION OF PREFERRED EMBODIMENT(S)

Figure 1:
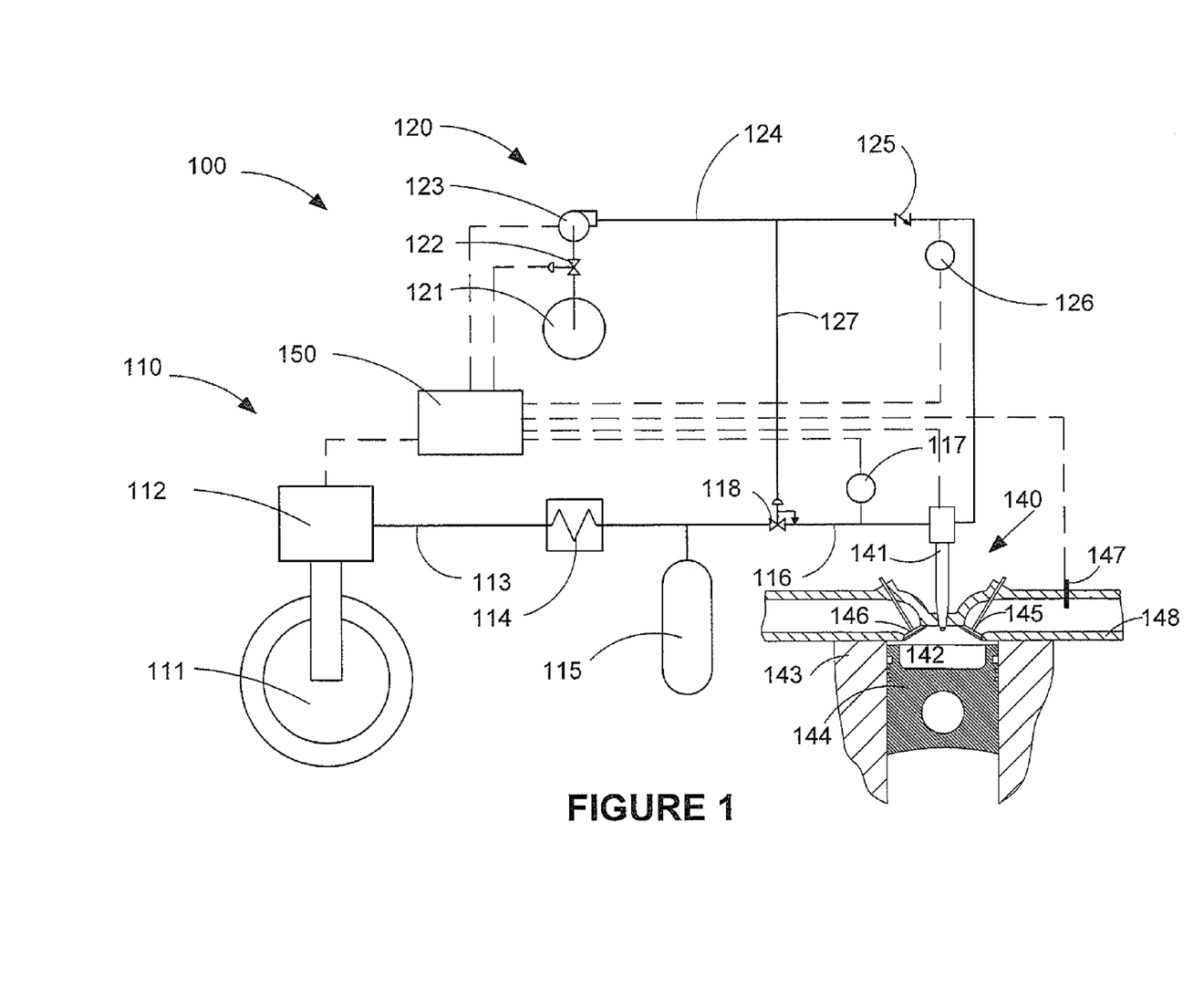
FIG. 1 is a schematic view of a direct injection gaseous-fuelled internal combustion engine system that can be used to practice the disclosed method. This system has a dual fuel injection valve which allows the separate and independent injection of a gaseous fuel and of a pilot fuel that is used to assist igniting the gaseous fuel.
Figure 2:
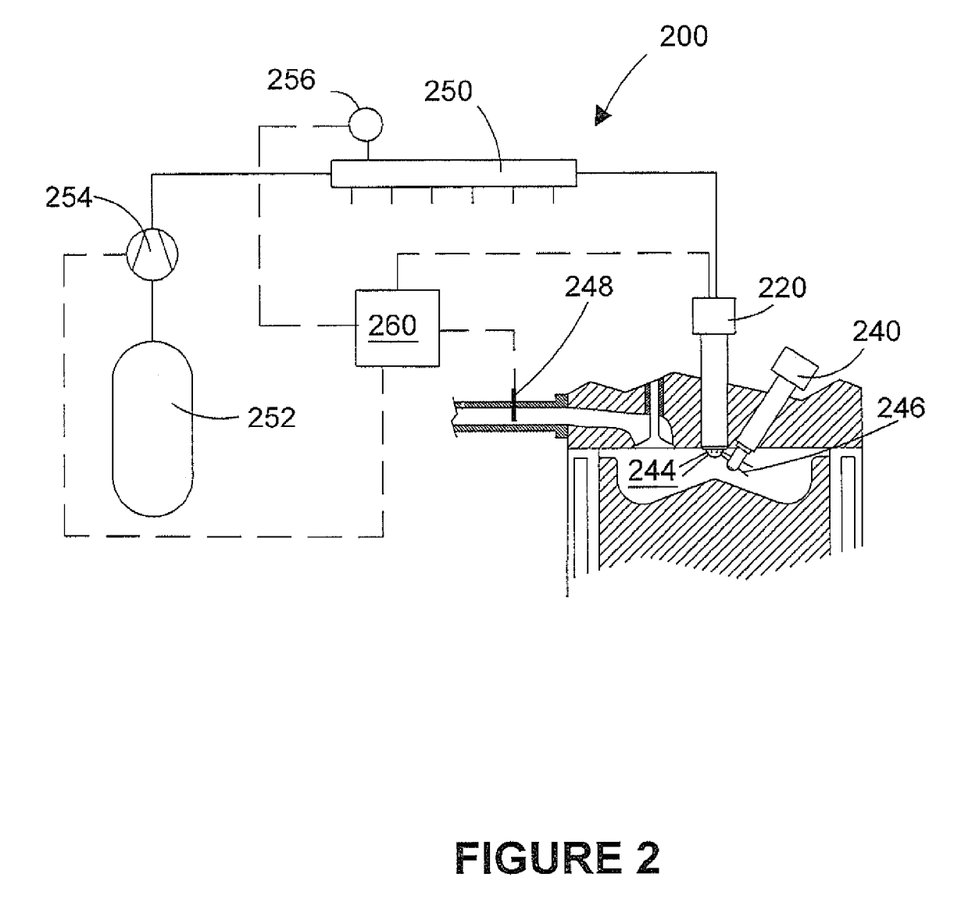
FIG. 2 is a schematic view of another example of a direct injection gaseous-fuelled internal combustion engine system that can be used to practice the disclosed method. This system uses a glow plug or another ignition means to assist with igniting the gaseous fuel.

FIGS. 1 and 2 show schematic views of two engine systems for injecting a gaseous fuel directly into the combustion chamber of an internal combustion engine. Herein "direct injection" is used to refer to the injection of fuel directly into the combustion chamber of an internal combustion engine, which is an approach that is technically distinct from engines that inject fuel into an engine's intake manifold or into the intake ports on the manifold side of the engine's intake valves. The schematic views shown in FIGS. 1 and 2 are not to scale, with some parts shown larger relative to the other parts to better illustrate their function.

When substituting diesel with cleaner burning gaseous fuels such as natural gas if one were to rely upon compression ignition alone, much higher temperatures and pressures for auto-igniting the gaseous fuel would be required. A solution to this problem, which allows substantially the same compression ratios and the major components of diesel engines to be retained, is to employ an ignition assist for example by injecting a small amount of more auto-ignitable fuel typically referred to as a pilot fuel (for example, diesel fuel) which will auto-ignite after being injected into the combustion chamber. Another example of an ignition assist for igniting the gaseous fuel includes an ignition plug such as a glow plug or a spark plug.

Referring to FIG. 1, internal combustion engine system 100 shows an illustrative embodiment of a direct injection gaseous-fuelled engine that uses a pilot fuel to assist in igniting the gaseous fuel injected into a combustion chamber. In this example, the system stores the gaseous fuel as a liquefied gas in gas storage tank 111 and injects both the gaseous fuel and the pilot fuel directly into the combustion chamber through fuel injection valve 141. The manner in which the fuel is stored is not important for the disclosed method, and the fuel can be stored in a pressure vessel as a compressed gas, or for a stationary application the fuel can be delivered from a pipeline and compressed to the needed pressure.

Internal combustion engine system 100 generally comprises gaseous fuel delivery subsystem 110, pilot fuel delivery subsystem 120, fuel injection subsystem 140, and controller 150. Each of these subsystems is described in more detail below together with a description of the manner in which they cooperate with each other to introduce a gaseous fuel into a combustion chamber where it can be combusted.

Gaseous fuel delivery subsystem 110 comprises storage tank 111, pump 112, gaseous fuel supply line 113, vaporizer 114, accumulator vessel 115, gaseous fuel rail 116, gaseous fuel rail pressure sensor 117, and pressure regulating valve 118. For engines used to power vehicles, space on-board the vehicle for carrying fuel can be limited so it is desirable to store gaseous fuels such as natural gas and hydrogen in liquefied form at cryogenic temperatures because this increases the energy density of the fuel, reducing the storage volume. Pump 112 is shown with a suction inlet disposed inside the cryogen space of storage tank 111, but pump 112 can also be immersed in the cryogen space, with a drive shaft extending therefrom and connected to a drive unit disposed outside the cryogen space or pump 112 can be completely external to storage tank 111, with a thermally insulated pipe connecting the pump to the storage tank. The disclosed method could also work with the gaseous fuel stored in a gaseous form, for example as compressed natural gas (CNG), stored in a pressure-rated vessel and with a compressor instead of a pump for raising the gaseous fuel pressure to injection pressure.

Pilot fuel delivery subsystem 120 comprises storage tank 121, metering valve 122, pump 123, pilot fuel rail 124, check valve 125, pilot rail pressure sensor 126, and pilot fuel line 127. In the illustrated embodiment, metering valve 122 controls pilot fuel pressure in pilot fuel rail 124 by controlling the quantity of pilot fuel that is delivered to pump 123. Pilot fuel line 127 dead-ends at the control chamber of pressure regulating valve 118 thereby operating a valve member in pressure regulating valve 118 to control the fuel pressure in gaseous fuel rail 116 as a function of the pilot fuel pressure in pilot fuel rail 124. Through this arrangement gaseous fuel pressure is controlled through pilot fuel pressure. The present method also applies to systems comprising other arrangements for separately controlling the pilot fuel rail pressure and the gaseous fuel rail pressure.

In preferred embodiments, the engine system illustrated in FIG. 1 is employed by a multi-cylinder engine with gaseous fuel supply rail 116 delivering fuel to a plurality of fuel injection valves, but to simplify the illustration of the apparatus, only one fuel injection valve and one combustion chamber is shown.

Fuel injection valve 141 injects the fuel directly into combustion chamber 142, which is defined by cylinder 143, piston 144 and cylinder head. Intake valve 145 opens during the intake stroke to allow an intake charge to be induced into combustion chamber 142. Intake valve 145 is otherwise closed. The intake charge can comprise air only or air and recirculated exhaust gas if the engine is equipped with an exhaust gas recirculation system (not shown). During an intake stroke exhaust valve 146 stays closed. Pressure sensor 147 is disposed in intake manifold 148 for measuring the pressure of the intake charge, also called the intake manifold pressure. The intake charge flows through intake manifold 148 on its way to the combustion chamber and pressure sensor 147 sends signals indicative of the intake manifold pressure to controller 150.

As shown in FIG. 1 by dashed lines, controller 150 communicates with a number of components to receive from sensors measured engine parameters, such as for example, intake manifold pressure, gaseous fuel rail pressure and pilot fuel rail pressure and sends signals to actuators of engine components, such as for example fuel injection valve 141, pump 112 and pump 123. Controller 150 can be the engine controller itself or it can be a separate controller that interacts with a conventional diesel engine controller used by the engine before being converted to operate with gaseous fuel as the primary fuel. When controller 150 interacts with a conventional diesel engine controller, controller 150 can receive input data from the diesel engine controller such as, by way of example, the timing for start of injection, the fuelling amount, and other input data indicating values associated with a parameter indicative of an engine operation state, such as for example engine speed. Herein "fuelling amount" is defined to mean the commanded amount of gaseous fuel that is introduced into the combustion chamber of a direct injection gaseous fuelled engine to achieve the desired engine efficiency and combustion. Controller 150 receives input data from sensors and/or from the diesel engine controller indicating values associated with the different parameters mentioned above and is programmed to calculate other parameters that can be used in the present method. For example, controller 150 can be programmed to calculate a parameter using a mathematical formula comprising at least two of the timing for start of injection, intake manifold pressure, compression pressure and gaseous fuel rail pressure, as further detailed below. In a preferred embodiment, controller 150 is programmed to determine injection on-time from the fuel rail pressure, the desired fuelling amount and a third parameter that correlates to in-cylinder pressure.

The engine system illustrated in FIG. 1 can further comprise additional equipment such as an exhaust gas after-treatment system for further controlling the vehicle emissions. Such an after-treatment system generally can comprise a particulate filter (not illustrated).

Referring to FIG. 2, internal combustion engine system 200 illustrates an embodiment of a direct injection gaseous-fuelled internal combustion engine system using a hot surface within the combustion chamber to assist in igniting the gaseous fuel injected directly therein. In combination with heat generated by the compression of the fuel charge during a compression stroke, a hot surface, such as the heated surface provided by glow plug 240 causes the gaseous fuel to ignite and propagate a flame throughout combustion chamber 244.

The system stores gaseous fuel in tank 252 and delivers it through fuel injection valve 220 into combustion chamber 244. The fuel is sprayed through the fuel injection ports of fuel injection valve 220. Reference number 246 indicates lines which represent the outline of fuel sprays. The gaseous fuel is ignited with assistance from an ignition device such as glow plug 240. Other ignition means such as a spark-plug can be employed instead of glow plug 240 for igniting the gaseous fuel introduced into the combustion chamber. The respective tips of fuel injection valve 220 and glow plug 240 extend into combustion chamber 244. At least one fuel injection port of fuel injection valve 220 is oriented to direct one of the fuel sprays towards glow plug 240, which in the illustrated embodiment is inclined towards the nozzle of fuel injection valve 220.

A gaseous fuel rail pressure between 20 MPa (3,000 psi) and 30 MPa (4,350 psi) in common rail 250 has been found to be suitable for tested engines, but it is understood that different pressures could be employed. The pressure in gaseous fuel rail is measured by a gaseous fuel rail pressure sensor 256. Also, the pressure in the intake manifold is measured by pressure sensor 248.

Internal combustion engine system 200 also comprises controller 260 which communicates with a number of sensors to receive measured engine parameters, such as for example, the intake manifold pressure and the gaseous fuel rail pressure. Controller 260 also sends signals to actuators of engine components, such as for example fuel injection valve 220 and compressor 254. As described with reference to the embodiment shown in FIG. 1, in the embodiment shown in FIG. 2, controller 260 can be the engine controller itself or it can be connected to a separate engine controller (not shown) from which it receives input data indicating values associated with a parameter indicative of an engine operation state, such as for example engine speed, and other input data such as for example the timing for start of injection or the fuelling amount. In a preferred embodiment, controller 260 is programmed to calculate injection on-time from the fuel rail pressure, the desired fuelling amount and a third parameter that correlates to in-cylinder pressure. For example, controller 260 can be programmed to determine the third parameter using a mathematical formula that uses at least two of: the timing for start of injection, intake manifold pressure, compression pressure and gaseous fuel rail pressure, as further detailed below.

Similar to an engine system that comprises a pilot fuel to assist with ignition of the gaseous fuel, as depicted in FIG. 1, the engine system illustrated in FIG. 2 can further comprise additional equipment such as an after-treatment system for further improving the vehicle emissions, including a particulate filter (not illustrated).

The engine systems shown in FIGS. 1 and 2 are illustrative of engines that inject a gaseous fuel directly into the combustion chamber late in the compression stroke. Engine systems like this, with the disclosed fuel injection pressures as examples, can benefit from the disclosed method for more accurately injecting a desired amount of gaseous fuel into the combustion chamber by adjusting the commanded injection on-time, but it will be understood that the disclosed method is not limited to application only to these embodiments. The disclosed method can be applied to engines that inject gaseous fuel directly into the combustion chamber where the differential pressure between the fuel injection pressure and the in-cylinder pressure is small enough that the amount of fuel introduced during the injection on-time can be significantly affected by variations in the in-cylinder pressure and the fuel rail pressure that occur in the normal operation of such a system.

The presently disclosed method determines fuel injection on-time based on a larger number of parameters than the existing methods without adding too much complexity to the algorithm for computing injection on-time. This is important for allowing a practical, efficient and fast method for accurately determining the injection on-time and indirectly accurately metering the amount of gaseous fuel injected into the combustion chamber of a direct injection gaseous fuelled internal combustion engine.

Figure 3:
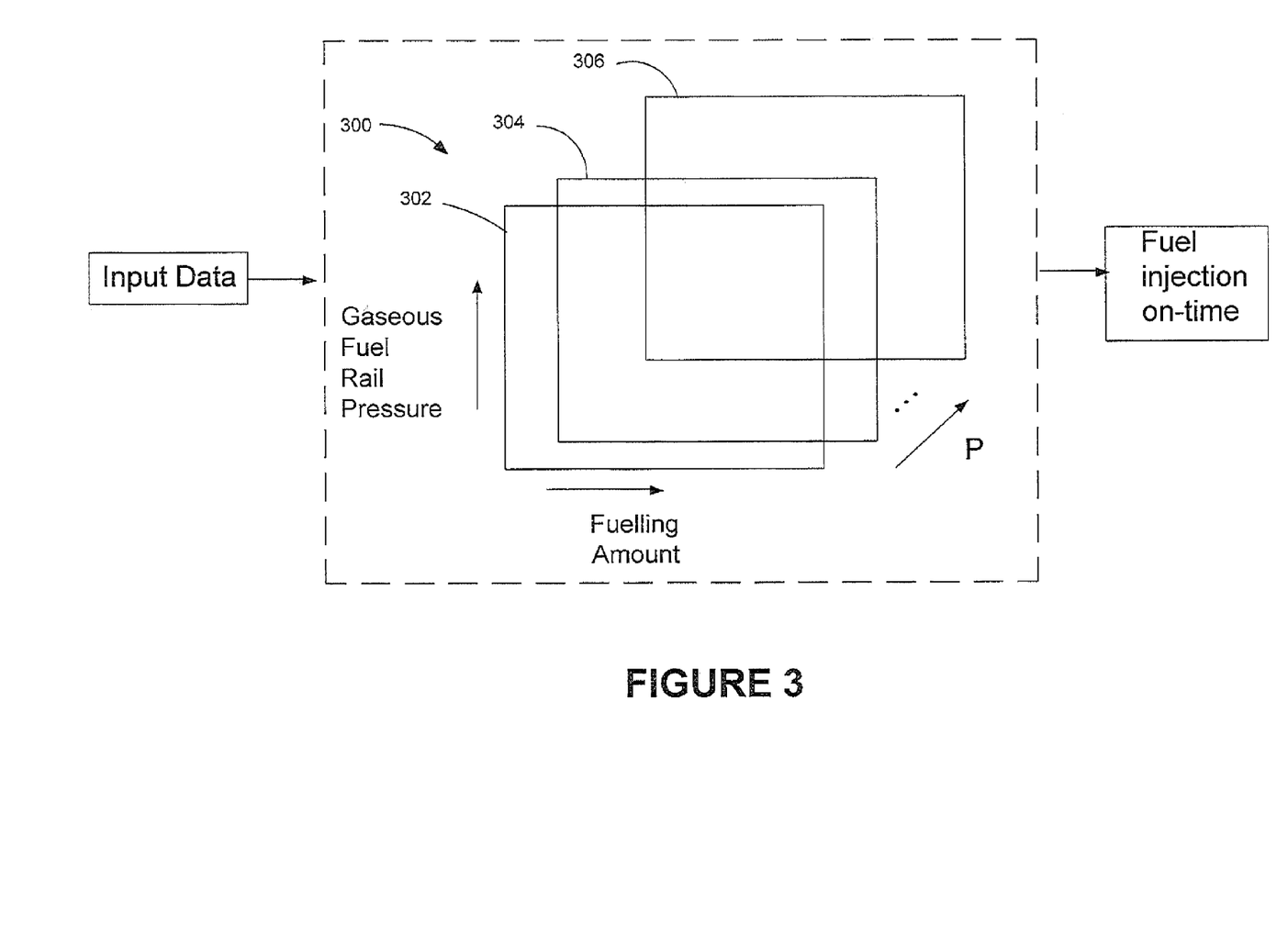
FIG. 3 is a diagram that illustrates the disclosed method for determining the injection on-time of the gaseous fuel from a plurality of look-up tables, with each look-up table defining on-time based on gaseous fuel rail pressure and desired fuelling amount for a fixed value of a third parameter.

FIG. 3 shows a diagram that illustrates the present method for determining the desired fuel injection on-time of the gaseous fuel from a plurality of look-up tables 300. Each look-up table defines fuel injection on-time values as a function of gaseous fuel rail pressure and the fuelling amount, with each table corresponding to a fixed value of a third parameter which is represented as "P". This plurality of empirically derived tables 300 which comprises for example tables 302, 304 and 306 can be stored in the memory of a controller, such as controller 150 illustrated in FIG. 1 or controller 260 illustrated in FIG. 2. In the following description of the disclosed method, references to controller 150 from FIG. 1 should be interpreted to also apply to controller 260 from FIG. 2 or more generally to a controller for an engine that employs direct injection of a gaseous fuel into the combustion chamber.

According to the presently disclosed method, controller 150 determines fuel injection on-time from plurality of look-up tables 300 stored in the controller's memory. Each table corresponds to a fixed value of the third parameter P, which is a parameter that correlates to in-cylinder pressure, for example timing for start of injection, intake manifold pressure or compression pressure. That is, while the third parameter P could be an estimation of the in-cylinder pressure, in preferred embodiments it is simply a computed value that correlates to in-cylinder pressure and that is calculated from at least two parameters that correlate to in-cylinder pressure. The advantage of this method is that it can be easier to compute third parameter P instead of in-cylinder pressure, while third parameter P still provides the information needed to improve the accuracy of the selected injection on-time. For example, parameter P can be the product of intake manifold pressure and timing for start of injection. In another embodiment, third parameter P can also take into account the gaseous fuel rail pressure, which combined with the parameters correlating to in-cylinder pressure, then correlates to the pressure differential between the gaseous fuel rail pressure and the in-cylinder pressure. For example, the calculation of third parameter P can comprise calculating the difference between gaseous fuel rail pressure and compression pressure. By defining parameter P by a mathematical formula that uses two or more parameters, with at least one of them correlating to in-cylinder pressure and more preferably at least two parameters that correlate to in-cylinder pressure, more than one parameter is represented and taken into account by parameter P, so that the calculation of injection on-time is a factor of at least three parameters (gaseous fuel rail pressure, fuelling amount, and the individual parameters that are used to compute parameter P).

Controller 150 receives input data from an engine controller or directly from sensors measuring parameters correlating to in-cylinder pressure, such as for example the intake manifold pressure and the timing for start of fuel injection. For example, intake manifold pressure is measured by sensor 147 and the measured values are inputted into controller 150 and the timing for start of fuel injection can be determined by controller 150 as a function of engine load and engine speed. If controller 150 is one that interacts with an engine controller (not shown), controller 150 can receive input data from the engine controller representing the timing for start of fuel injection and the desired fuelling amount. Controller 150 also receives input data representing the gaseous fuel rail pressure measured by pressure sensor 117. Controller 150 can also be programmed to take inputted data and calculate parameters such as the value of the compression pressure based on the intake manifold pressure, the engine's compression ratio and a polytropic index, according to mathematical formulas known to those who are familiar with this technology.

Based on data stored in the look-up tables and on the received input data regarding parameters that correlate to in-cylinder pressure, the current method can determine the desired injection on-time either directly from the look-up tables stored in the controller's memory or by interpolating between two look-up tables as further explained below.

After controller 150 receives input data indicating values for gaseous fuel rail pressure, fuelling amount and parameters that correlate to in-cylinder pressure, it uses a predetermined formula, as described above to determine the value of the third parameter P and this value for third parameter P is used by the present method to determine injection on-time. More specifically, based on the calculated value of the third parameter P, the method further determines a desired injection on-time value by referring to plurality of look-up tables 300. If the calculated value of the third parameter P is a value that corresponds to the fixed value of third parameter P which is associated with a look-up table stored in the controller's memory, the disclosed method determines the desired fuel injection on-time from that look-up table by selecting the injection on-time based on the data inputs received for the gaseous fuel rail pressure and the fuelling amount. If the calculated value of third parameter P does not match any of the fixed values for third parameter P that are associated with the look-up tables stored in the controller's memory, the controller identifies two look-up tables which are associated with fixed values of third parameter P that are closest in value to the value of calculated third parameter P (determined from inputted parameters that correlate to in-cylinder pressure). The controller then determines the desired fuel injection on-time by interpolating between the two on-time values determined from these two look-up tables for the same gaseous fuel rail pressure and fuelling amount. Different methods of interpolation can be used such as polynomial interpolation and spline interpolation but in one embodiment it has been found effective to employ simple linear interpolation between the two tables with the closest fixed values for third parameter P.

In one embodiment, when third parameter P is a product of intake manifold pressure and timing for start of injection, the plurality of look-up tables stored in the controller's memory can comprise as few as three look-up tables. First look-up table 302 corresponds to an empirically determined minimum fixed value Pmin of third parameter P, another look-up table 306 corresponds to an empirically determined maximum fixed value Pmax of third parameter P and third look-up table 304 corresponds to an empirically determined intermediate fixed value Pi of third parameter P that is greater than the minimum value and smaller than the maximum value. The intermediate fixed value can be selected to correspond to a local minimum value or a local maximum value of a curve that represents fuel injection on-time plotted across a range of values for third parameter P from Pmin to Pmax, or, for example, the intermediate fixed value can correspond to an inflection point of such curve. That is, the intermediate fixed value can correspond to a point on such curve where the first derivative of the function which defines the curve of a plot of injection on-time across a range of values for third parameter P is zero (corresponding to a local minimum or maximum) or where the second derivative of the function which defines such curve is zero (corresponding to an inflection point), or, in another example, it can be the point on the curve where the curvature is greatest. In another embodiment, the intermediate fixed value can be chosen according to other criteria, for example points on the curve that correspond to chosen engine speed values.

Figure 4:
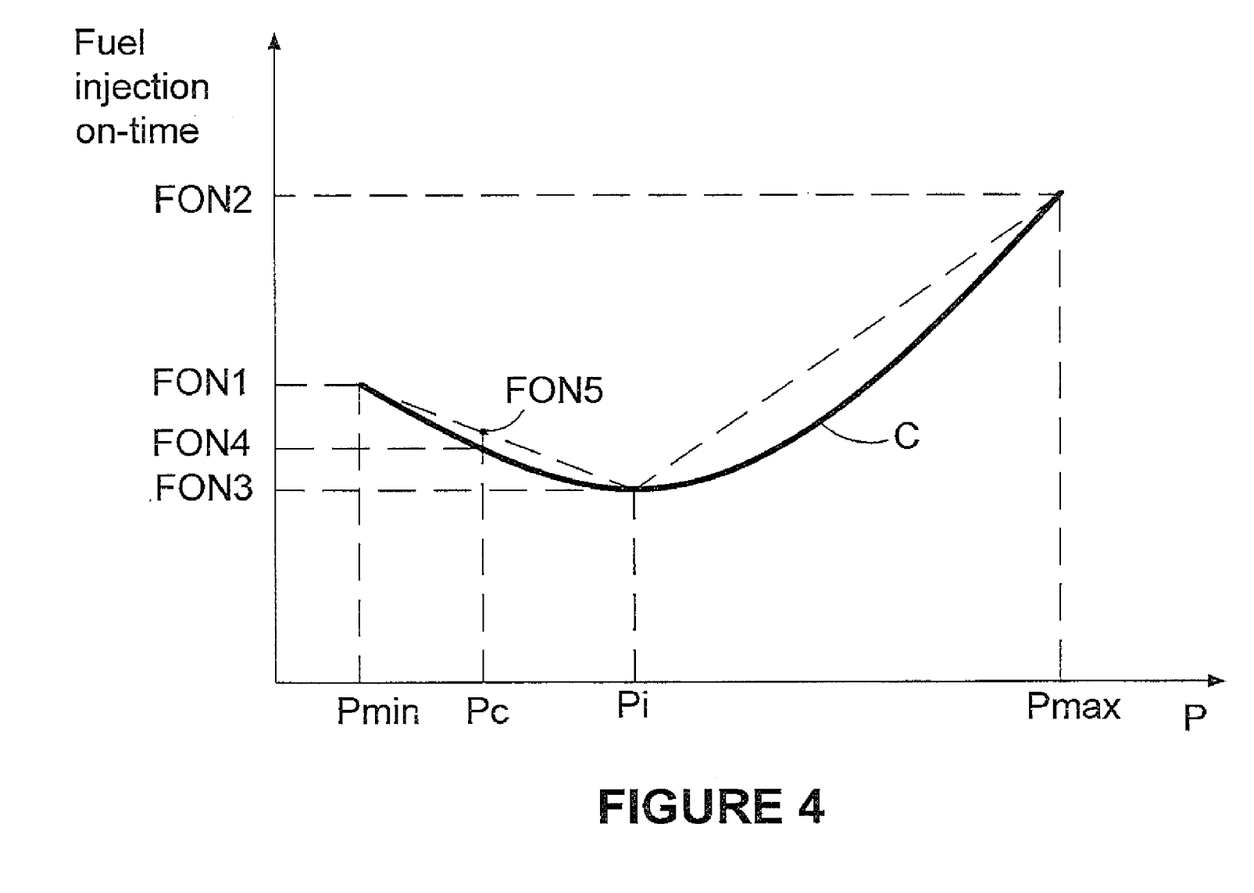
FIG. 4 illustrates the curve which represents fuel injection on-time values according to values of the third parameter.

FIG. 4 illustrates an example of how the injection on-time is determined using interpolation between the plurality of look-up tables. Curve C represents the fuel injection on-time values for a constant gaseous fuel rail pressure and fuelling amount, plotted over a range of values for third parameter P. Values Pmin, Pi and Pmax correspond respectively to the fixed values of third parameter P of tables 302, 304 and 306. At points Pmin, Pi and Pmax the injection on-time values (FON1, FON3 and FON2 respectively) can be empirically generated. That is, to each value on the P axis curve C associates a fuel injection on-time value shown as a FON on the axis corresponding to fuel injection on-time. For example for Pmin the corresponding value retrieved from table 302 is indicated in FIG. 4 as FON1, for Pmax the corresponding value retrieved from table 306 is indicated as FON2 and for Pi the corresponding value retrieved from table 304 is indicated as FON3. As described above, Pi is a fixed value of third parameter P selected to correspond, in this case, to a local minimum of curve C. If curve C is found to be of a more complex shape, several intermediate look-up tables can be used, each corresponding to a fixed value of parameter P for a point along the curve that helps to define its shape to more accurately determine the injection on-time by interpolation between the tables associated to fixed values for parameter P.

With reference still to FIG. 4, according to the present method, Pc is the value of third parameter P that is calculated from the input data sent to the controller, and the desired injection on-time is calculated by interpolation between the stored injection on-times associated with the Pmin, Pi and Pmax. Using common interpolation techniques if Pc equals or is close to one of Pmin, Pi or Pmax, then the injection on-time associated with the value of Pc is determined from tables 302, 304 or 306 (the same result would be obtained by piecewise constant interpolation). More likely Pc will have a value that is between the values of two of Pmin, Pi and Pmax and then the desired fuel injection on-time can be determined, for example, by linear interpolation between the on-time values retrieved from the two tables, which correspond to the fixed values of third parameter P which are closest to Pc. For example, as illustrated in FIG. 4, if calculated value Pc is greater than Pmin and smaller than Pi, value FON5 of the fuel injection on-time will be determined by interpolating between values FON1 and FON3 determined from tables 302 and 304 as a function of the gaseous fuel rail pressure and fuelling amount values. In the example illustrated in FIG. 4 FON5 is determined by linearly interpolating between values FON1 and FON3. It can be observed that FON5 can be different in value than FON4 which is the fuel injection on-time value which corresponds on curve C to the calculated value Pc of third parameter P. The difference between values FON4 and FON5 is a trade off between the simplicity of linear interpolation which allows faster computation of the injection on-time versus an even more accurate determination of injection on-time that could be achieved by storing data for more intermediate look-up tables and/or by using a more complex form of interpolation such as polynomial interpolation or spline interpolation. While linear interpolation has been found to provide adequate accuracy with sufficiently quick computational times, as controller data processing speeds are expected to continue to improve, more complex forms of interpolation and/or more intermediate look-up tables could be employed in the future with sufficiently quick computational times. When calculated value Pc is very close to one of the fixed values of third parameter P the present method can use the "piecewise constant interpolation" method to determine the fuel injection on-time. Herein "piecewise constant interpolation" is meant to include the situation when calculated value Pc is equal to one of the fixed values of third parameter P for which a look-up table was stored in the plurality of look-up tables 300.

In some embodiments the desired fuel injection on-time can be further adjusted to correct for factors other than those that correlate to in-cylinder pressure but that nevertheless, can still have an influence on the desired injection on-time. For example, a correction factor can be applied according to a parameter indicative of an engine operational state, such as engine speed. Such correction factors can be retrieved from a look-up table (not shown) that defines the correction factor as a function of fuelling amount and a parameter indicative of the engine operational state.

Figure 5:
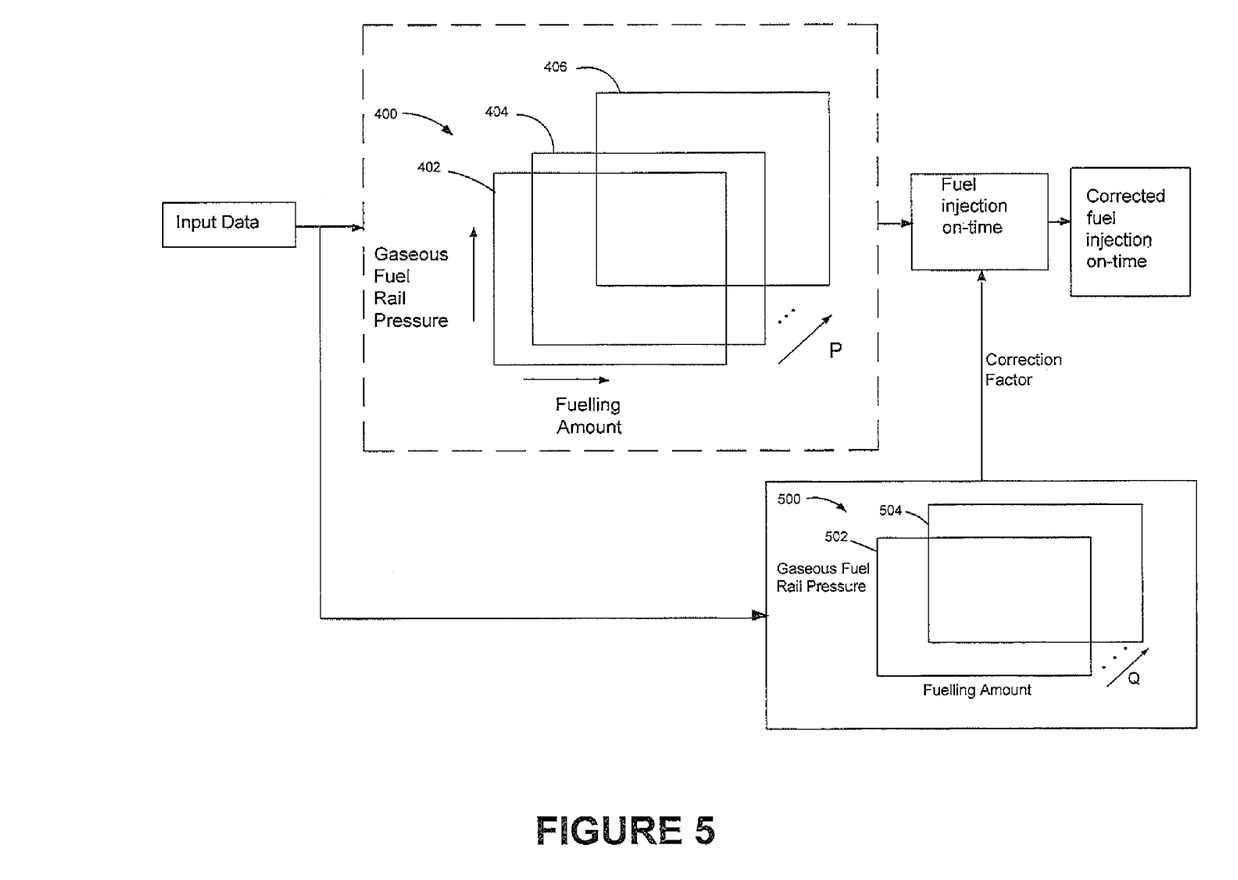
FIG. 5 is a diagram that illustrates another method for determining the injection on-time of the gaseous fuel by combining the method illustrated in FIG. 3 with correcting the determined value of the fuel injection on-time by a correction factor selected from a plurality of lookup tables that associate gaseous fuel rail pressure and fuelling amount with a fourth parameter.

FIG. 5 is a diagram of another embodiment of the present method that comprises determining the injection on-time of the gaseous fuel from plurality of look-up tables 400 (similar to the plurality of look-up tables 300 as described in the method embodiment illustrated in FIG. 3). The method illustrated in FIG. 5 further comprises correcting the determined injection-on time by applying a correction factor that is determined as a function of a fourth parameter that is shown as "Q" that also correlates to in-cylinder pressure. Like with the determination of the desired injection on-time using third parameter P, another plurality of look-up tables 500, each one of these associated with a fixed value for the fourth parameter Q, stores values of the correction factors as a function of gaseous fuel rail pressure and fuelling amount.

In FIG. 5 controller 150 (shown in FIG. 1) retrieves from memory data stored in look-up tables 400 which comprises, for example, tables 402, 404 and 406, each table defining fuel injection on-time values as a function of gaseous fuel rail pressure and fuelling amount corresponding to a fixed value of third parameter P. Controller 150 also retrieves from memory data stored in look-up tables 500 comprising, for example, tables 502 and 504, which define values for correction factors as a function of gaseous fuel rail pressure and fuelling amount with each table corresponding to a fixed value of fourth parameter Q. Like third parameter P, fourth parameter Q is also a parameter which correlates to in-cylinder pressure, such as for example, timing for start of injection, intake manifold pressure and compression pressure. Fourth parameter Q is chosen to be a different parameter than the one chosen for third parameter P. The manner of determining the correction factor based on fourth parameter Q is essentially the same as the manner of determining the desired injection on-time based on third parameter P. That is, the value of fourth parameter Q determined from the input data is used to interpolate between correction factors stored in tables 500. By including fourth parameter Q in the method to determine a correction factor that is applied to the desired injection on-time, more parameters correlating to in-cylinder pressure are used for ultimately determining the desired fuel injection on-time and this can further improve the accuracy of the metered fuel amount introduced into the combustion chamber. For example if third parameter P correlates to timing of start of injection, fourth parameter Q can be chosen to correlate to intake manifold pressure. This method can also be applied if third parameter P is calculated based on a mathematical formula combining several parameters that correlate to in-cylinder pressure, for example if third parameter P is a product between timing for start of injection and intake manifold pressure, fourth parameter Q can be the compression pressure or if third parameter P is a difference between gaseous fuel rail pressure and compression pressure, fourth parameter Q can be timing for start of injection.

In preferred embodiments the look-up tables are stored in the controller's memory or in memory accessible to the controller, and the data in the look-up tables is based upon empirically derived data collected by testing the engine to achieve desired performance, combustion efficiency and emission levels for each engine state.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of determining fuel injection on-time for an internal combustion engine fuelled with a gaseous fuel that is injected directly into a combustion chamber through a fuel injection valve, the method comprising:
- (a) storing predetermined injection on-time values in a plurality of look-up tables, with on-time in each look-up table being a function of gaseous fuel rail pressure and fuelling amount and with each table associated with a fixed value for a third parameter, which correlates to in-cylinder pressure;
- (b) sending input data to a controller, said controller determining from said input data, values for said gaseous fuel rail pressure, said fuelling amount and said third parameter;
- (c) identifying from said plurality of predetermined look-up tables two look-up tables which are associated with said fixed values for said third parameter that are closest in value to that of said third parameter determined in step (b);
- (d) retrieving respective injection on-times as a function of gaseous fuel rail pressure and fuelling amount from said two look-up tables identified in step (c); and
- (e) determining a desired injection on-time by interpolating between injection on-time values retrieved in step (d) based on the value of said third parameter determined in step (b).

2. The method of claim 1 further comprising collecting said input data during a compression stroke and determining said desired injection on-time for a fuel injection event beginning during said compression stroke.

3. The method of claim 1 where said third parameter is calculated as a function of at least one parameter that correlates to in-cylinder pressure.

4. The method of claim 1 wherein said third parameter is a product of two parameters that correlate to in-cylinder pressure.

5. The method of claim 4 wherein said two parameters are intake manifold pressure and timing for start of injection.

6. The method of claim 1 wherein said third parameter is one of:
- (i) timing for start of injection;
- (ii) intake manifold pressure; and
- (iii) compression pressure.

7. The method of claim 1 wherein said third parameter is calculated using a mathematical formula comprising at least two parameters that correlate to in-cylinder pressure and which are sent to said controller as part of said input data, said at least two parameters selected from the following:
- (i) timing for start of injection;
- (ii) intake manifold pressure;
- (iii) compression pressure; and
- (iv) gaseous fuel rail pressure.

8. The method of claim 1 wherein said third parameter is calculated by said controller as a difference between two parameters at least one of which correlates to in-cylinder pressure.

9. The method of claim 1 wherein said third parameter is calculated by said controller as a difference between said gaseous fuel rail pressure and compression pressure.

10. The method of claim 9 wherein said compression pressure is calculated as a function of intake manifold pressure, the engine's compression ratio and a polytropic index.

11. The method of claim 1 wherein said third parameter also correlates to a pressure differential between in-cylinder pressure and injection pressure.

12. The method of claim 1 wherein said input data further comprises an engine parameter that correlates to an engine operational state, said method then further comprising correcting said injection on-time by applying a correction factor which is retrieved from a look-up table that determines said correction factor as a function of said fuelling amount and said engine parameter.

13. The method of claim 12 wherein said engine parameter is engine speed.

14. The method of claim 1 wherein said plurality of look-up tables comprises:
- (i) a first look-up table associated with a fixed value for said third parameter, which is equal to or near an empirically determined minimum value for said third parameter;
- (ii) a second look-up table associated with a fixed value for said third parameter, which is equal to or near an empirically determined maximum value for said third parameter; and
- (iii) a third look-up table associated with a fixed value for said third parameter, which is between said empirically determined minimum and maximum values for said third parameter.

15. The method of claim 14 wherein for a range of values for said third parameter between said minimum value and said maximum value, said fixed value for said third parameter that is associated with said third look-up table corresponds to an inflection point, a local minimum or a local maximum of a curve of a plot of injection on-time across said range.

16. The method of claim 15 wherein said third parameter is the product of timing for start of injection and intake manifold pressure and said desired injection on-time is determined by linear interpolation.

17. The method of claim 1 further comprising:
- (i) storing in a plurality of predetermined correction factor look-up tables correction factor values retrievable as a function of said gaseous fuel rail pressure and said fuelling amount with each table corresponding to a value for a fourth parameter that is one of said parameters that correlates to in-cylinder pressure which is different than said third parameter;
- (ii) sending to said controller input data indicating values for said fourth parameter;
- (iii) from said plurality of predetermined correction factor look-up tables identifying two correction factor look-up tables which correspond to fixed values of said fourth parameter that are closest in value to that of said fourth parameter in said input data;
- (iv) determining a desired correction factor by interpolating between said two correction factor look-up tables; and
- (v) correcting said injection on-time by applying said desired correction factor.

18. The method of claim 17 wherein said fourth parameter is one of timing for start of injection, intake manifold pressure, and compression pressure.

* * * * *